United States Patent [19]

Perez et al.

[11] Patent Number: 5,379,328
[45] Date of Patent: Jan. 3, 1995

[54] NUCLEAR CORE TRIP SETPOINTS

[75] Inventors: Rolando Perez, Enfield; Mehran Golbabai, Windsor, both of Conn.

[73] Assignee: Combustion Engineering, Inc., Windsor, Conn.

[21] Appl. No.: 201,382

[22] Filed: Feb. 24, 1994

Related U.S. Application Data

[63] Continuation of Ser. No. 984,536, Dec. 2, 1992, abandoned.

[51] Int. Cl.$^6$ .............................................. G21C 7/36
[52] U.S. Cl. .................................................... 376/217
[58] Field of Search ................................ 376/216, 217

[56] References Cited

U.S. PATENT DOCUMENTS

| | | | |
|---|---|---|---|
| 4,080,251 | 3/1978 | Musick | 176/24 |
| 4,318,778 | 3/1982 | Musick | 376/216 |
| 5,009,833 | 4/1991 | Takeuchi et al. | 376/217 |
| 5,293,411 | 3/1994 | Miyamoto et al. | 376/210 |

FOREIGN PATENT DOCUMENTS

| | | |
|---|---|---|
| 0180085 | 10/1985 | European Pat. Off. |
| 2041605A | 8/1979 | United Kingdom |

OTHER PUBLICATIONS

Database WPI Week 8643, Derwent Publications Ltd. London, GB; AN 86-281324 & JP,A,61 204 591 (Hitachi) 10 Sep. 1986.
Patent Abstracts of Japan vol. 16, No. 39 (P-1305) 30 Jan. 1992 & JP,A,03 245 097 (Toshiba Corp.) 31 Oct. 1991.

Primary Examiner—Donald P. Walsh
Assistant Examiner—Frederick H. Voss
Attorney, Agent, or Firm—L. James Ristas; John H. Mulholland

[57] ABSTRACT

A method for generating an on-line trip signal when a measured one (p1') of a plurality of operating parameters (p1, p2, p3, ... pN) which define a limit surface on a multidimensional reactor operating space, exceeds a limit value (*p1) on the limit surface. The method includes the steps of storing in an array having at least three dimensions, a set of discrete limit surface values *p1(r) of parameter p1 in ordered triplets, [*p1(r), p2(r) and p3(r)] under reference conditions in which parameters p2 and p3 vary discretely and parameters p4 ... pN are deemed constant. While operating the reactor, the on-line values p1', p2', p3' of the parameters p1, p2 and p3 are measured. An interpolation is made among the selected triplets to estimate the surface limit value *p1' corresponding to the measured values of p2' and p3'. Preferably, the method includes measuring the operating parameters p4, p5 to obtain values p4' and p5'. The storage means includes a second array defining a quantitative relationship among the values in triplets [*p1(a), p4(a), and p5(a)]. The estimated value of *p1' is then adjusted by the step of interpolating between values of p4(a) and p5(a) based on the measured values p4', p5' to arrive at an adjusted estimate of the power, *p=*p1'+*p1'(a) or *p1=(*p1')(*p1'(a)).

19 Claims, 14 Drawing Sheets

NSSS VARIABLES AFFECTING FUEL DESIGN LIMITS

VARIABLE                                                  PARAMETER

DNBR

| | | TRIP | MEAS. | LIMITED |
|---|---|---|---|---|
| V1 | CORE POWER | *p1 | p1 | |
| V2 | AXIAL POWER DISTRIBUTION | | p2 | |
| V3 | RADIAL POWER DISTRIBUTION | | p3 | |
| V4 | CORE COOLANT INLET TEMPERATURE | | p4 | |
| V5 | PRIMARY COOLANT PRESSURE | | p5 | |
| V6 | PRIMARY COOLANT MASS FLOW | | | p6 |
| V7 | DESIGN BASIS DYNAMICS | | | |

LINEAR HEAT RATE

| | | TRIP | MEAS. | LIMITED |
|---|---|---|---|---|
| V1 | CORE POWER | p1* | p1 | |
| V2 | AXIAL POWER DISTRIBUTION | | p2 | |
| V3 | RADIAL POWER DISTRIBUTION | | p3 | |
| V4 | DESIGN BASIS DYNAMICS | | | |

(The order is arbitrary)

Fig. 2

CEA Group Insertion Index

NUCLEAR CORE TRIP SETPOINTS

This is a continuation of copending application Ser. No. 07/984,536 filed on Dec. 2, 1992, now abandoned.

BACKGROUND OF THE INVENTION

The present invention relates to safety systems for pressurized water nuclear reactors, and more specifically, to protection systems which generate a reactor trip signal when necessary to maintain the integrity of the nuclear fuel and fuel rod cladding.

The analog protection and monitoring systems in operation on the Nuclear Steam Supply Systems (NSSS) delivered by Combustion Engineering, Inc. (C-E) during the 1970's, were designed to assure safe operation of the reactor core in accordance with established licensing criteria. The achievement of this objective is accomplished by specifying (a) Limiting Safety System Settings (LSSS) in terms of parameters directly monitored by the Reactor Protection System (RPS) and (b) Limiting Conditions for Operation (LCO) on reactor system parameters.

The calculation of the LSSS, supported by the LCO, establishes the limits for automatic RPS action to assure that the specified acceptable fuel design limits (SAFDL) are not exceeded for the design basis events. Fuel design limits are specified on peak linear heat rate (LHR) and departure-from-nucleate-boiling-ratio (DNBR). In the former case, the limit is conservatively set at a minimum peak linear heat rate that corresponds to steady-state centerline melt. In the latter case, the limit is set at a DNBR which provides at least a 95% probability, with 95% confidence, that DNB is avoided based on the DNBR correlation being used. The design of the existing RPS requires that appropriate correlations be applied to express the LSSS as functions of monitored parameters.

U.S. Pat. No. 3,791,922, "Thermal Margin Protection System for a Nuclear Reactor", describes some aspects of the computation of the trip limit on DNBR in such analog RPS. Correlations that have been previously calculated off-line, are embodied in co-efficients such as alpha, beta, and gamma in analog circuitry which computes the thermal margin set-point (as a pressure trip) in accordance with the following expression:

$$Pvar = alpha\ (QPf) + beta\ (Tc - 490) + gamma.$$

The resulting trip set-point limit is manifested as a minimum permitted pressure (Pvar) for a given core inlet coolant temperature (Tc), and effective core power (QPf). Alternatively, the trip can be manifested as a maximum permitted effective power (percent of rated full power), for a given system pressure. A family of such curves can be generated corresponding to each of a variety of system pressures.

U.S. Pat. No. 3,998,693 "Thermal Margin Control", discloses an improvement in which additional operating conditions are taken into account. The trip limits are expressible in terms of the lowest permissible pressure as a function of core power.

The methodology upon which these known systems are built, is described in a document entitled "C-E Set Point Methodology (C-E Local Power Density and DNB LSSS and LCO Set Point Methodology for Analog Protection Systems)", filed with the U.S. Nuclear Regulatory Commission as document CENPD-199 Rev-1P on Apr. 13, 1982. A non-proprietary version was filed with the NRC and became available to the public as of 1986. Similarly, the methodology describing the approach for arriving at the trip setpoints for the Westinghouse NSSS, described in "Design Bases For The Thermal Overpower Delta T and Thermal Overtemperature Delta T Trip Functions", WCAP-8746 (1977). These documents are hereby incorporated by reference.

The purpose of the RPS is to assure that the SAFDL on the LHR and the DNBR are not exceeded during certain design basis events (DBE). Anticipated operational occurrences (AOO) are defined as the sub-set of DBE's that are expected to occur one or more times during the life of a nuclear power unit, including single component or control system failures, that can result in transients that require protective action to prevent exceeding the SAFDL for fuel centerline melting and DNB. The reactor protection system is designed and the NSSS is operated such that AOO assumed to begin from the LCO do not cause the SAFDL to be exceeded.

Certain design basis events produce state parameter changes which are either directly monitored by, or conservative with respect to, the values assumed for these parameters by the reactor protection system. This group of transients can therefore be terminated by a reactor trip without violating the SAFDL. However, other AOO produce system parameter changes which are not directly monitored by the reactor protection system. For these AOO, Limiting Conditions for Operation must be established such that the thermal margin required to sustain the most limiting event without exceeding the SAFDL is continuously maintained during steady-state operation. Steady-state operation is defined to include not only base load operation, but normal operation within the LCO including power changes and xenon oscillations.

The LHR and DNBR cannot be measured directly or even indirectly. Rather, they are derived parameters which are dependent on a multiplicity of other operating parameters, some of which are not measurable, either. This situation presented a significant limitation to the computational capabilities of analog circuitry which was designed during the 1970's. These problems were overcome to some extent, by performing a wide variety of calculations using all significant variables, in an off-line, powerful, digital computer. A multiplicity of conditions are parameterized among all significant variables, and relationships established among the variables. With this available knowledge from off-line calculations, the RPS in the plant is designed to operate on a subset of the off-line variables, that are measurable in the plant.

The analog circuitry as shown, for example, in FIGS. 1A and B of the '693 patent, combines the measured parameters with coefficients and function generators which embody quantitative relationships extracted from the off-line computations. In essence, the conventional analog RPS of the type described in the patents mentioned above, uses analog circuitry to provide functional definitions of a permissible multi-dimensional operating space, in terms of measurable parameters which are typically fewer in number than all the significant variables used in the off-line computation. As a result, the functional definition of the operating space is unnecessarily conservative. In other words, in order to assure that the functional fit in the RPS will protect the reactor in the event of every adverse combination of operating conditions, the functional fit unnecessarily dictates that the reactor be tripped under some combinations of conditions which do not pose a safety risk. As a result, the operating margin associated with the functional representation of the permitted operating space in the analog system, is in many instances significantly less than the operating margin that would be justified on the basis of the off-line computations.

Such unnecessary limitations in operating space were minimized in a later generation of reactor protection systems from Combustion Engineering Inc., as described in U.S. Pat. No. 4,330,367 "System and Process for the Control of a Nuclear Power System" and U.S. Pat. No. 4,318,778 "Method and Apparatus for Controlling a Nuclear Reactor". These patents disclose a digital reactor protection system, in which the LHR and DNB limits are calculated on-line. This type of RPS requires considerably more instrumentation, data transmission, and computational power, than the prior, analog systems. For example, three level ex-core detectors and a safety grade control rod indication system are required, as well as a complete on-line thermal hydraulic computation of DNB. As a practical matter, a fully digital RPS cannot be backfit into existing, older generation plants which now have the analog RPS.

SUMMARY OF THE INVENTION

It is, accordingly, an object of the present invention, to increase the operating margin in pressurized water nuclear steam supply systems that utilize an analog RPS, without a change in the type or number of measurement instruments and data communication cabling in the plant.

It is a further object of the invention to replace the analog circuitry in the RPS system of existing plants, with a digital RPS that achieves greater operating margin, while employing the same measured parameter input signals that are available to the analog RPS.

In particular, it is an object of the invention to provide a computer based trip system for protection against fuel centerline melt and DNBR, that increases operating margin without requiring a three level excore detector system, safety grade control rod indication, or a fast running on-line thermal hydraulics computation.

The invention takes advantage of the calculational capabilities of microprocessors to perform on-line refinements to basic safety limit calculations performed in advance, off-line. This generates trip limits for existing core conditions as opposed to conventional analog trip systems, where the trip setpoints are based on the most adverse combination of possible values of the parameters that affect the margin to fuel failure. The on-line calculational enhancement results in additional margin to trip limits, by removing the unnecessary conservatisms of conventional analog systems resulting from the off-line fitting of the trip settings to the entire operating space.

Furthermore, the additional computational capability afforded by microprocessors allows formulations of trip limits which consider margin related parameters that are not currently credited in analog trip systems.

In accordance with the present invention, quantitative information calculated off line is more directly accessible on line to the RPS. The off line information provided to the microprocessor includes data on margin to DNB and margin to fuel center line melt for a reference set of margin-related parameters. This can be stored in tabular form in the RPS, in terms of the dependency of a trip limit parameter to margin related measurable parameters assuming other parameters to be fixed at the reference conditions. On-line adjustment is then made to take advantage of the value of measured parameters that are more favorable than the reference conditions.

The invention in a broad sense, is a method for generating an on-line trip signal when a measured one (p1′) of a plurality of operating parameters (p1, p2, p3, ... pN) which define a limit surface on a multidimensional reactor operating space, exceeds a limit value (*p1) on the limit surface. The method includes the steps of storing in an array having at least three dimensions, a set of discrete limit surface values *p1($r$) of parameter p1 in ordered triplets, [*p1($r$), p2($r$) and p3($r$)] under reference conditions in which parameters p2 and p3 vary discretely and parameters p4 ... pN are deemed constant. While operating the reactor, the on-line values p1′, p2′, p3′ of the parameters p1, p2 and p3 are measured. At least four of the triplets [*p1($r$), p2($r$), p3($r$)], which have the closest relation of the triplet values p2($r$) and p3($r$) to the measured values p2′ and p3′, are selected from the array. An interpolation is made among the selected triplets to estimate the surface limit value *p1′ corresponding to the measured values of p2′ and p3′. The estimated value *p1′ is delivered as a trip parameter limit signal p to the trip signal generator. The measured value p1′ is compared with the estimated value *p1′ and a trip signal is generated if p1′ exceeds *p1′. Preferably, the method includes measuring the operating parameters p4, p5 to obtain values p4′ and p5′. The storage means includes a second array defining a quantitative relationship among the values in triplets [*p1($a$), p4($a$), and p5($a$)]. The estimated value of *p1′ is then adjusted by the step of interpolating between values of p4($a$) and p5($a$) based on the measured values p4′, p5′ to arrive at an adjusted estimate of the limited signal on power, *p1=*p1′+*p1′($a$) or [*p1=(*p1′)(*p1′($a$))].

In one conventional analog based RPS systems, trip limit is expressed in terms of a functional fit of the parameter of overpower versus axial power distribution shape index (ASI) at various core radial peaking factors. The radial peaking factors at any level of gross core power, are assumed to be at the values associated with the power-dependent control rod insertion limits (PDIL). As an improvement to such conventional RPS, the reference condition data in the present invention are in the form of ordered pairs of overpower margin to limit versus ASI data values which more closely than a "functional fit", bound the data points of the off-line calculations. The reference data are stored as triplets [*p1($r$), p2($r$), p3($r$)] of the parameters of overpower margin, ASI, and radial peaking (or its proxy such as power level) at constant condition of other parameters. Since most NSSS having analog RPS do not measure radial peaking directly and do not include a control element assembly (CEA) position indicator, CEA insertion and associated radial peaking are assumed to be at the power dependent insertion limit corresponding to a given power. Hence, the CEA insertion component of the triplet is directly related to power and derived based on the measured power at the plant. On line, the margin at reference conditions is converted to a margin at a different set of conditions (i.e. the on line conditions), via tables, partial derivatives, or other mathematical relationships. Appropriate adjustments for uncertainties and system delays are also included.

Thus, the RPS in accordance with the invention receives the analog signals commensurate with measured parameters which affect margin limits and then, via on-line computation in the microprocessors, determines the trip limit as adjustments or off sets from the reference condition data. The inventive RPS will determine the power at which trip would occur (overpower) based on the measured core power and the ASI received from the excores assuming other parameters to be at their reference conditions. The trip limit is then adjusted for the actual plant conditions of at least some of the margin related parameters that were assumed constant at reference conditions, using the adjustment data. The result of this process is a trip limit for the plant's current conditions expressed in terms of one margin-related parameter which can be measured, e.g., power, pressure, inlet coolant temperature (Tc) or core average coolant temperature (Tavg). This trip limit on the parameter is then compared to the measured value to decide whether a reactor trip is necessary.

This invention represents a significant advantage relative to conventional analog RPS systems, which have been designed to minimize the number of on-line mathematical operations required to be handled by analog circuitry in the RPS cabinets in the plant. Typically, the mathematical operations are embodied in one, or a limited set of equations in the trip circuitry which must protect the entire operating space (U.S. Pat. No. 3,791,922). The result is that the trip limit calculated by this equation(s) is much more conservative than the true design limit for most plant conditions. The invention can thus be viewed as a system performing an on-line set point analysis calculation using essentially the same methodology as is conventional for the analog plants, but having the advantage of knowing the existing plant conditions and the ability to tailor its calculation to those conditions.

This approach is also different from the digital core protection calculator as described in U.S. Pat. No. 4,330,367 and related patents identified above, in that it does not perform the thermal hydraulic calculations on-line. Instead, the invention relies on margin data from curve fits or the like, which were previously calculated off-line. Since the thermal hydraulics calculation is performed off-line in advance, there is no concern about the speed of thermal hydraulic calculations. Therefore, the reference condition margins and the basis for the adjustment to take credit for actual plant operating conditions, can be made with a more detailed and sophisticated off-line calculation, than would normally be available even in a fully digital, on-line RPS such as the type described in the '367 patent. The present invention does not require knowledge of the core average or hot channel axial shape to generate the trip limits. Instead, it uses excore axial shape index from a two level detector system, as a measure of the axial power distribution. This facilitates adapting the invention for use on plants already equipped with a two level excore detector system.

Another feature which distinguishes this invention from the existing RPS is its treatment of the control rod positions. Current analog RPS system trip setpoints are generated off-line assuming that the rods have been inserted to the limits allowed in the Technical Specification (called Power Dependent Insertion Limit for C-E plants and Rod Bank Insertion Limits for Westinghouse plants). A more rodded configuration means more adverse power distribution (i.e., higher radial peaks), hence more restrictive trip limits. Conventionally, no credit is taken for operating the unit in a less rodded configuration than the PDIL since these systems do not have the capability to measure rod position on-line. The invention allows for an Administrative Power Dependent Insertion Limit to be input at the plant and adjusts the calculated margin limits accordingly. As long as the allowed rod insertions are less (i.e., more restrictive) than the Technical Specification PDIL, credit can be taken in the on-line generation of trip limits, without the expensive upgrades to safety grade rod position indicators.

BRIEF DESCRIPTION OF THE DRAWINGS

These and other objects and advantages of the invention are set forth in greater detail in the following description and accompanying drawings, in which:

FIG. 2 is a list of variables that affect the fuel design limits, in an arbitrary order;

DESCRIPTION OF THE PREFERRED EMBODIMENT

Figure 1A:
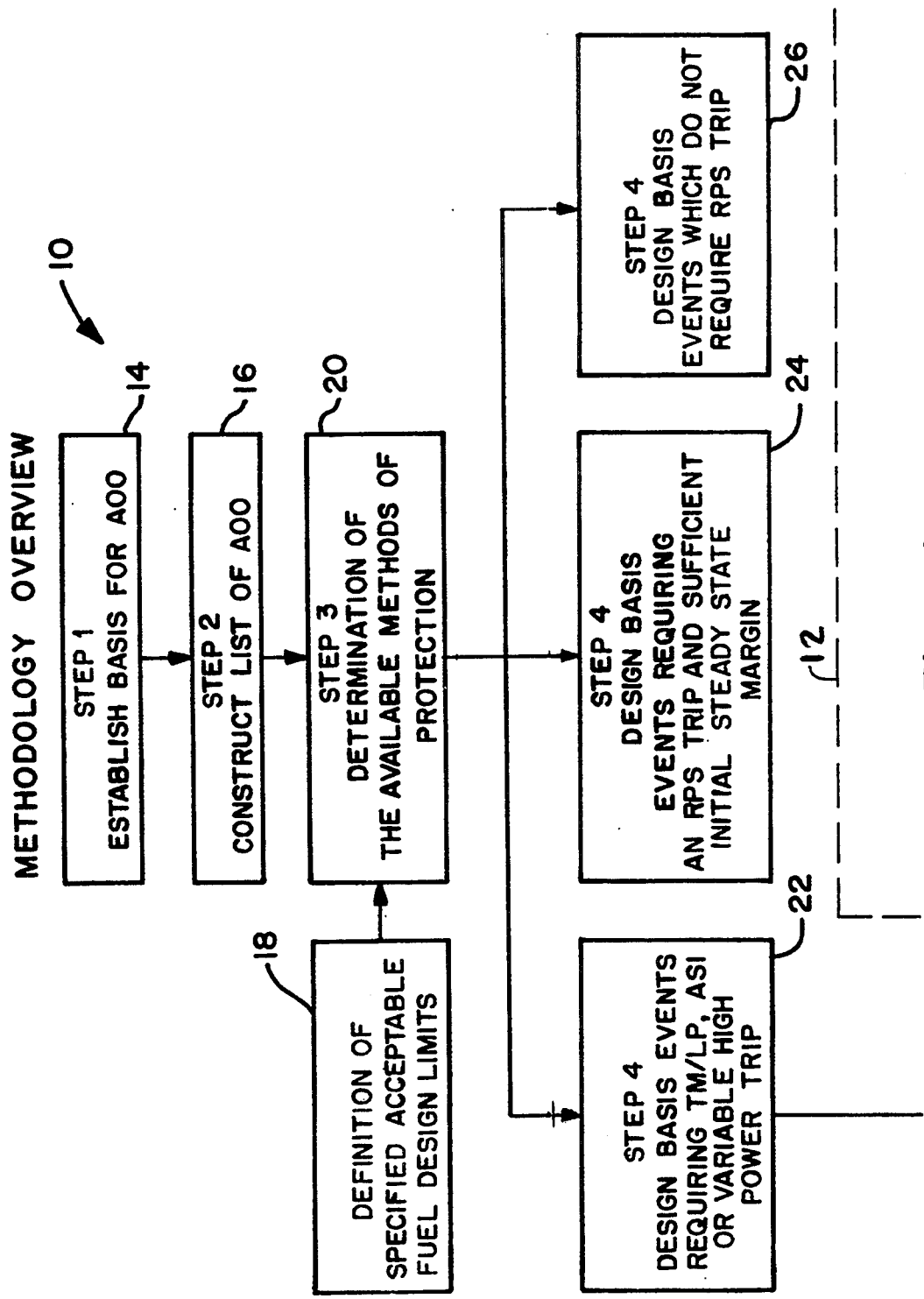
FIG. 1 is a schematic representation of the methodology associated with the present invention.
Figure 1B:
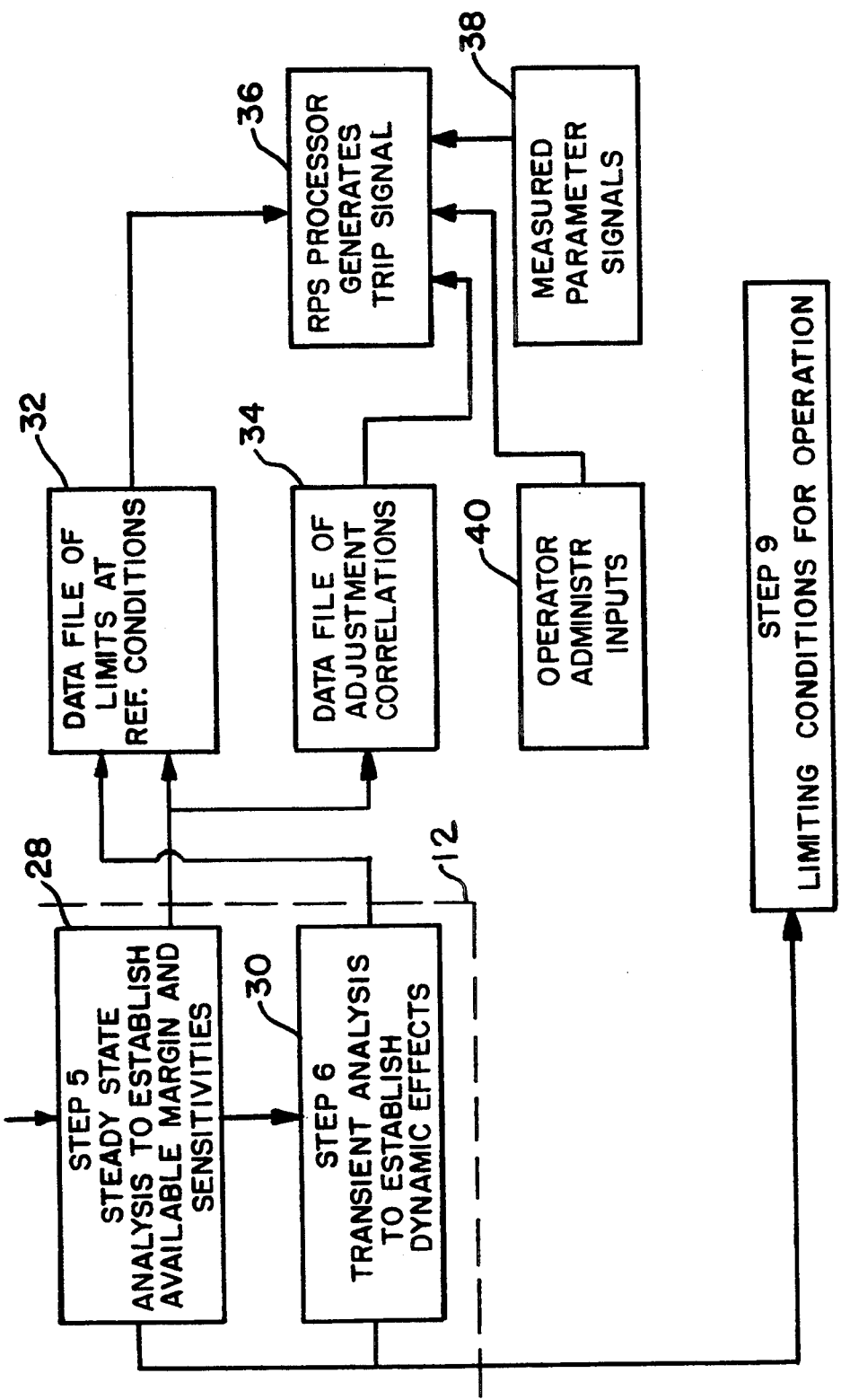

FIG. 1 is a representation of the methodology overview 10 associated with the present invention. A first group of the activities in the various blocks are performed off-line, in some cases in advance of the completion and installation of the RPS in the plant. This first group of activities are shown above the dashed line 12. The results of these activities are embodied in RPS equipment in the plant; these appear below the dashed line in FIG. 1. It should be appreciated, however, that the equipment and data files represented below the dashed line, originate off-line as part of the overall methodology.

Steps 1–3 in blocks 14, 16, 18 of FIG. 1 involve the establishment of the bases for the anticipated operational occurrences (AOO), followed by the completion of a list of AOOs for the plant. Then, using appropriate definitions of specified acceptable fuel design limits (SAFDL) from 18, a decision is made at 20 as to the available methods of protecting the plant in the RPS system. The foregoing steps do not form a part of the present invention, but are briefly described only to provide the appropriate context for understanding the invention. The present invention in essence, "piggy backs" off the completion of the prior steps for an existing, operational plant.

In the protection philosophy for the LHR and DNB criteria associated with PWR NSSS, the design basis events are assigned into three categories represented at 22, 24, 26 as steps 4, 4' and 4" respectively. The first includes design basis events requiring a reactor trip regardless of initial plant operating conditions. The second includes design basis events requiring an RPS trip other than those directly related to LHR and DNB, the effectiveness of which depends on the prior maintenance of sufficient initial steady state operating margin. The final category of design basis events does not require an RPS trip in order to maintain the safety of the plant.

The permissible operating space of the core in an NSSS can be contemplated at three levels. At a theoretical level, one can assume that if the NSSS is constructed according to all nominal design values, there exists a theoretical operating space within which the fuel will not experience centerline melt or DNB. This theoretical operating space cannot, of course, be predicted exactly, but rather can be analytically modelled at a second level using a multiplicity of variables that are known to influence the LHR and DNB. These variables(v) are shown in FIG. 2. Various equations, correlations, and algorithms well known to nuclear engineers, are available for modelling the analytical operating space based on variations of the indicated variables. This modelling is performed in relatively powerful mainframe computers. The underlined variable represents design basis dynamics. Design Basis Dynamic effects is the allowance for adverse change in other variables of FIG. 2 during the design basis transients which can not be adequately tracked by the RPS on-line due to system limitations (e.g., delays, decalibration, etc.). The third level of understanding pertains to the operating space which can be monitored or controlled in the nuclear power plant, based on measurable parameters(p).

It should be appreciated that, theoretically, many factors can influence the behavior of the reactor, and therefore the permitted theoretical operating space. In analytically modelling such a system, a finite number of variables are utilized to approximate the theoretical behavior of the system. In a similar manner, at the third, or plant level, a generally lesser number of variables are measurable, and only these can be utilized for monitoring, control, and protection purposes. As used herein, "variables" means the factors used in the off-line analytical modelling, whereas the "parameters" means factors that are measurable in the plant. "Measurable" should be understood as including both directly measurable and derivable or proxy parameters (such as ASI).

Focusing again on FIG. 1, the methodology represented therein can thus be understood as converting the analytically based operating space limits determined from activities above the dashed line, into a limited operating space as definable by the measured parameters in the plant. Moreover, it is the object of the present invention, to cost-effectively provide an RPS in the plant, which increases the limits of the operating space, so that it more nearly approaches the analytical operating space.

On a conceptual level, the existing analog RPS methodology uses a relatively coarse functional relationship of the operating parameters, to define an operating space that is a sub-set of the analytical operating space. The attempt in the prior art to utilize a functional fit of the operating parameters to the analytical variables, while always remaining within the permitted analytical operating space, has resulted in an overly restrictive set of Limiting Conditions for Operation and Limiting Safety System Settings. The functional fit in the RPS of the prior art, is derived from, but not anchored to, the analytical operating space. In contrast, the present invention provides stored data which includes anchors, or reference points, from the analytical operating space, and uses adjustments based on actual operating parameters in the plant, to define limits as an off-set to an analytical anchor point.

The analytical operating space requires two basic types of modelling scenarios. The first, represented in block 28, requires the computation of many steady state conditions covering a wide variety of combinations of the variables, each combination producing information concerning the onset of DNB or LHR. The second major type of computation, is the transient analysis represented in block 30 to establish the Dynamic Effects resulting from the DBE.

The steady state analyses using the variables(v) as performed off-line, are converted into a data file 32 which is preferably in the form of tables defining reference conditions, and another data file 34 containing quantitative relationships by which the reference data points at 32 can be adjusted in processor 36 based on actual operating parameters as measured in the plant at 38.

Examples of Design Basis Events of the type analyzed in block 30 of FIG. 1, are CEA withdrawal, boron dilution, excess load, loss of load, loss of feedwater flow, excess heat removal due to feedwater system malfunction, and reactor coolant system depressurization. The thermal margin trip is potentially available for all of these events, and the LHR trip is potentially available for most of these events. It should be appreciated that other trips are available in the RPS system, but the present invention is particularly adapted for the thermal margin and LHR trips, because these trips are defined by a multi-dimensional operating space. The other trips are responsive to the measurement of a single parameter, (e.g., high pressurizer pressure, low steam generator level, low flow, low steam generator pressure).

Turning again to FIG. 2, it may be seen that in the preferred embodiment of the present invention, the dependence of the operating space in the plant on DNB limits, is specified by six parameters, $p1, p2, p3, \ldots p6$, corresponding respectively to the analytical variables v1, v2, v3, . . . v6. In the illustrated embodiment, the parameter of core power *p1 is deemed the trip parameter, in that the value of the power *p1 as computed in the RPS as a limit condition, will be compared with the measured power p1 of the reactor, and a trip signal will be generated if the computed value signal exceeds the measured signal. The trip signal for the power parameter p1, is determined based on the measured parameters p2, p3, p4 and p5. The parameter p6 can be assumed constant because of administrative limits or procedures imposed on the operation of the plant, or it can be a "dialed" in, derived, or directly measured.

It should be appreciated that the improved RPS according to the invention, may employ fewer measurable parameters, than the number of variables used in the analytical modelling. Furthermore, a particular parameter such as p2 may be a simplified, analogous, or derived quantity, relative to the corresponding variable v2. For example, whereas the variable v2 in the analytical model is a substantially continuous axial power distribution, the corresponding parameter p2 is axial shape index, which is defined as, $$ASI = \frac{\text{power in core lower half} - \text{power in core upper half}}{\text{total core power}}$$

Figure 3:
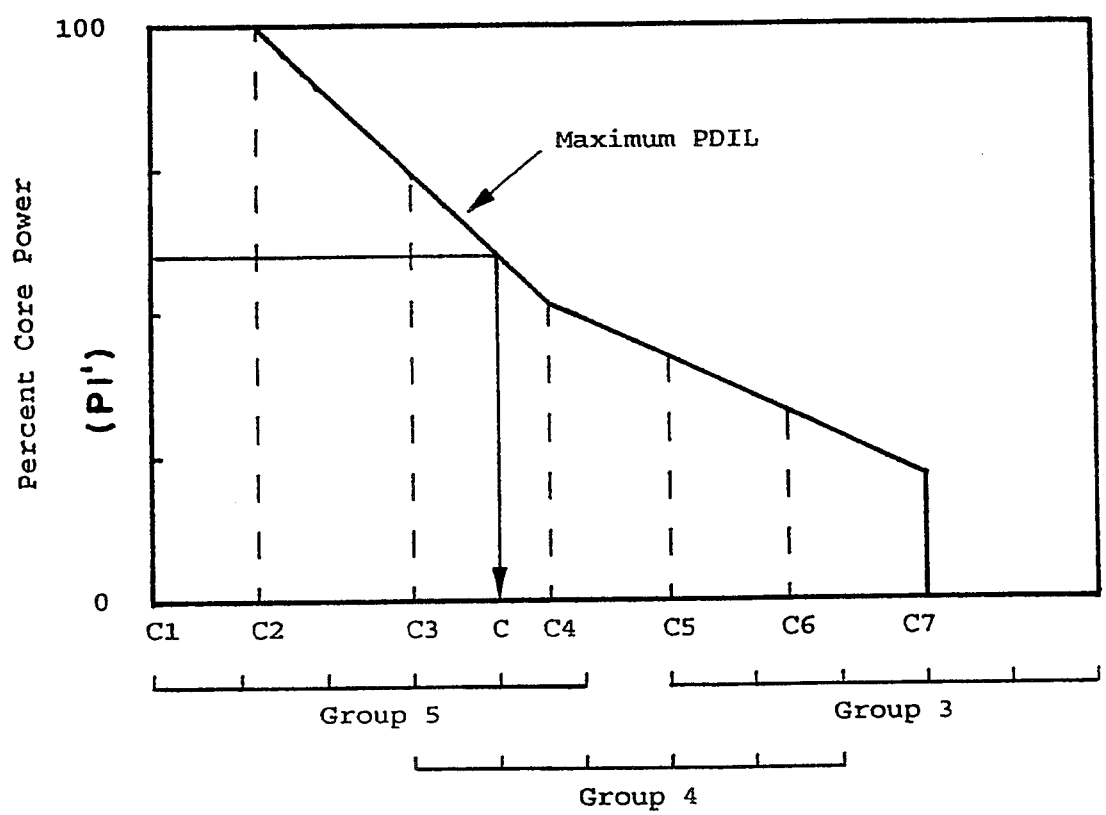
FIG. 3 is a schematic representation of the power dependent insertion limit, by which for any measured core average power, the maximum control rod insertion, and thus associated radial peaking, can be inferred consistent with the technical specifications for the plant.

Similarly, the radial power distribution variable v3 in the analytical model may represent a variety of possible control rod insertion conditions at a given core power, whereas the parameter p3 may be a proxy (power level) which represents a preestablished radial peak at a Tech Spec limit condition at a given core power (such as the PDIL shown in FIG. 3).

In a typical plant, the power parameter p1, is the maximum of thermal power (derived from cold leg and hot leg temperature difference), or the flux power (derived from excore neutron detectors). The axial power distribution parameter p2, is a derived value from the two excore detectors. The parameter p3, radial peaking factor, is assumed to be at the maximum value allowed at a given core power by the control rod insertion scheme. The inlet temperature parameter p4, is simply the input from the cold leg resistance temperature detector. The parameter p5 is input from the pressurizer pressure sensors. The parameter p6, core flow, may be measured by the differential pressure in the steam generators or assumed to be at the administrative limit.

The variables v7 are used to compute the Dynamic Effects, which are calculated for the design basis event which produces the most rapid approach to the SAFDL. The minimum DNBR associated with the other variables is then computed, using one of several well known DNBR correlations, such as the C-E-1 or the W-3 correlation. The RPS does not explicity include parameters corresponding to the design basis dynamics variable. Rather, the limits of the operating space as permitted by the data values in block 32 of the RPS, indirectly reflect the v7 scenarios.

The characterization of the parameters for the linear heat rate trip in relation to the analytical variables, is similar although smaller in number, than for the DNBR. For this trip, the core power p1 and axial shape index p2 are measured or derived, whereas the radial power distribution p3 is maintained below a maximum peak through the limiting condition for operation (i.e. PDIL and Fxy LCO).

Power to the Linear Heat Generation Rate SAFDL

Figure 4:
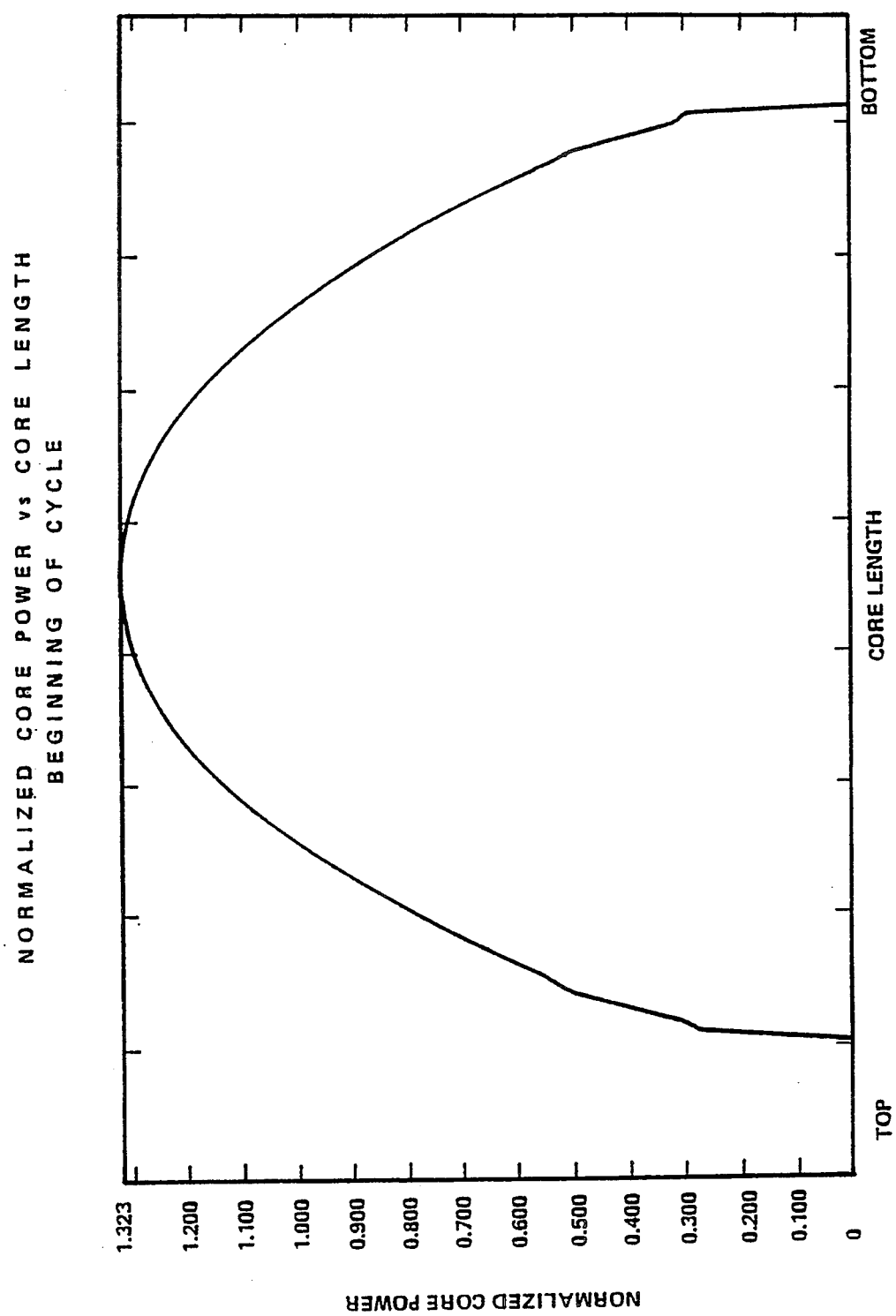
FIG. 4 is a graph showing typical normalized core axial power distribution at beginning of cycle.
Figure 5:
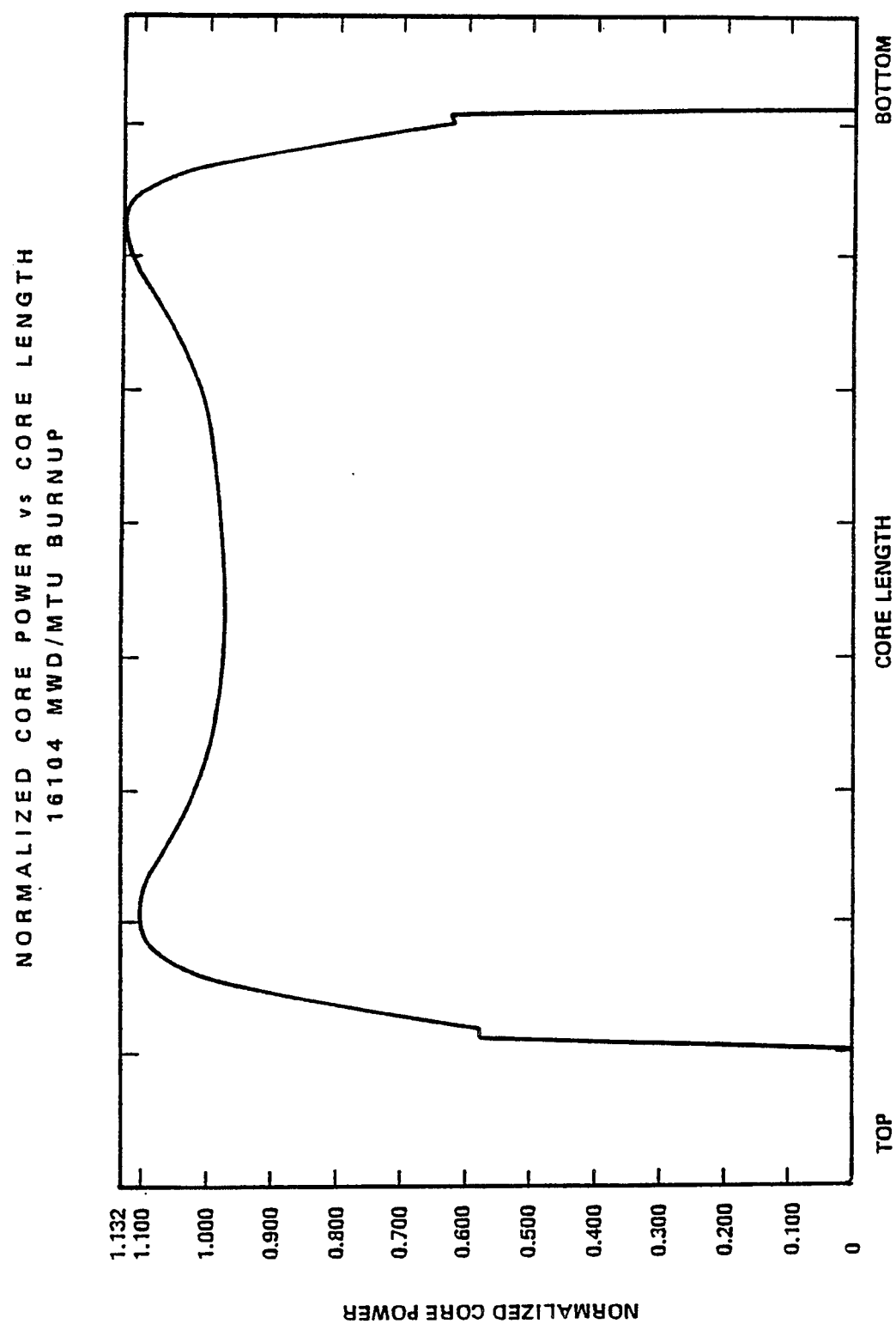
FIG. 5 is a graph showing a typical normalized core axial power distribution at or near end of a burnup cycle.

The reactor protection system has the important function of limiting core operation to conditions such that no violation of the Specified Acceptable Fuel Design Limits (SAFDL) occur. One of the SAFDL is the minimum peak linear heat rate (LHR in kw/ft) which corresponds to the temperature at which steady state fuel centerline melt is assumed to occur. For a given reactor design, there is a given value of LHR which is specified as the SAFDL. For the LHR variables shown in FIG. 2, a power distribution axial shape analysis determines the value of the core power level v1 at which the LHR SAFDL would be reached for each of the power distributions v2, v3. A one dimensional (axial) model of the core which can perform static and time dependent reactivity and power distribution calculations at selected stages of burnup is used to calculate the axial power distribution v2 for the hot pin and corresponding $F_q^{3-D}$ for each core condition considered. FIGS. 4 and 5 represent some of these conditions.

The quantity used to establish monitoring and protection system limits on linear heat rate is the Power-to-Fuel-Design-Limit on linear heat rate, $P_{fdl}$. The quantity $P_{fdl}$ is defined as:

$$P_{fdl} = (W_{cm} \cdot 100)/(\text{Aug } F_q^{3-D} \cdot F_e \cdot W_{avg})$$

where
  $W_{cm}$ = linear heat rate SAFDL (kw/ft)
  Aug $F_q$3-D = Ratio of the 3-D peak LHR to the average LHR, including the augmentation factor for fuel densification effects;
  $F_e$ = Local heat flux engineering factor allowance for fuel manufacturing tolerances on power peaking; and
  $W_{avg}$ = Core average value of linear heat rate, at full rated reactor power.

The quantity $P_{fdl}$ as defined above, is the percent of rated power to which the reactor could hypothetically be raised, for the given Aug $F_q$3-D, before the fuel centerline melt limit of $W_{cm}$ would be reached. For each core condition examined off-line, a value of $P_{fdl}$ and axial shape index (ASI) are generated and stored as an ordered pair (e.g., $P_{fdl}$, ASI).

Figure 6:
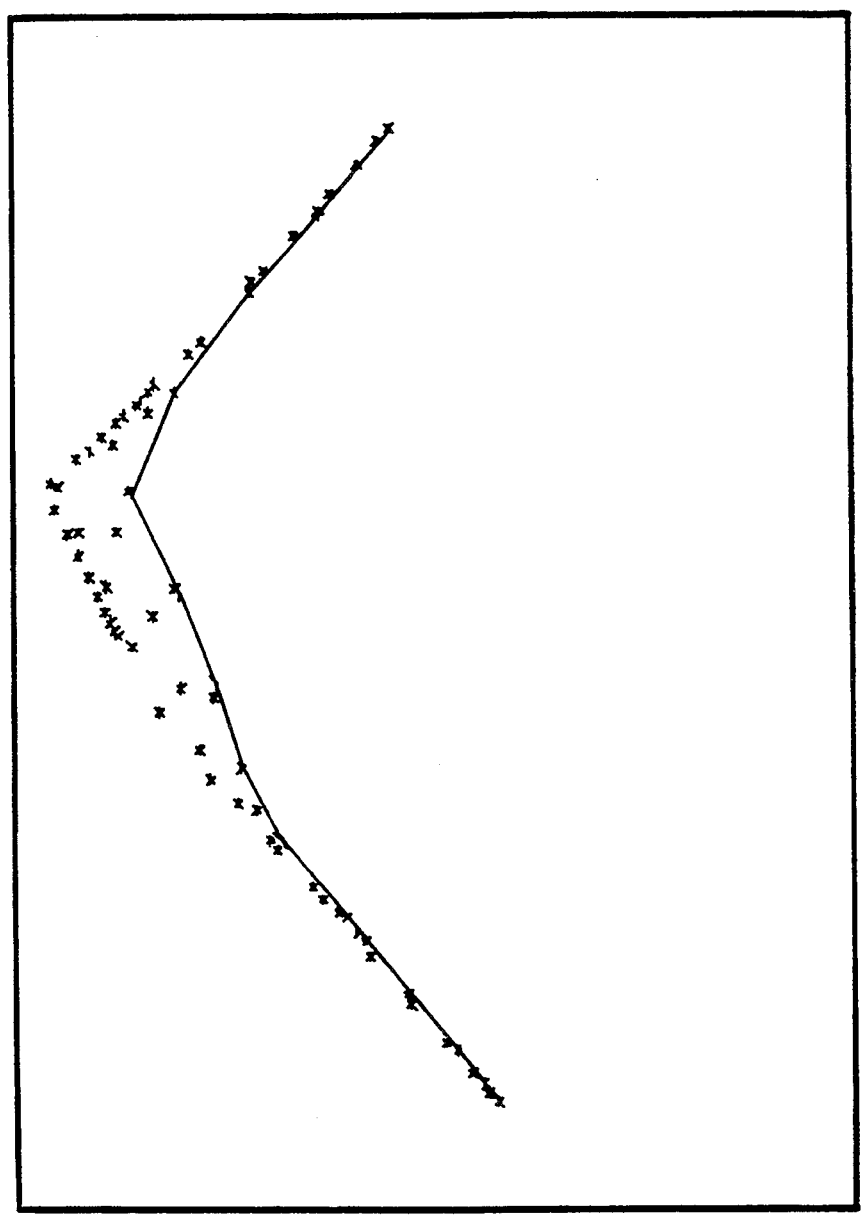
FIG. 6 is a graphic representation of the relationship between fuel design limits on linear heat rate or DNB, for various axial shape indices, as computed off-line.

Such pairs are generated for at least Beginning of Cycle (BOC) and End of Cycle (EOC) burnups. The data pairs are then conservatively bounded. The bounding lines for the BOC and EOC (or more burnups) are combined to yield a conservatively bounding limit for all cycle burnups of Pfdl vs ASI corresponding to a given CEA insertion (i.e., given power), as shown in FIG. 6. Similar data are generated for other CEA insertions corresponding to specific power level versus CEA insertion pairs selected from the PDIL transient insertion limit (FIG. 3).

The axial power distributions used in the derivation of Pfdls are more extreme than one would encounter during normal operation. Each nuclear fuel vendor has its method for generating axial power distributions which conservatively represent those encountered during normal operation, plant maneuvers, expected perturbations, and design basis events which must be protected by the trip. One method, used by C-E, is the Free Oscillation methodology described in Sections 2.3.2 through 2.3.3.3 of CENPD-199. These techniques have been reviewed by the NRC and were found appropriate for generating conservative axial power distributions for the conditions which must be protected by the trip action.

Power to the DNBR SAFDL

The other SAFDL of importance for the reactor protection system is the minimum DNBR which provides at least a 95% probability, with 95% confidence, that DNB is avoided based on the DNBR correlation being used. FIG. 2 indicates that the power level v1, at which this SAFDL is reached is dependent upon the normalized pseudo hot pin axial power distribution v2, $P_{php}(z)$, and the integrated radial power peaking factor v3, $F_r$, applicable to that power distribution. The pseudo hot pin axial power distribution, the corresponding integrated radial peaking factor, and the axial shape index are also calculated off-line for each axial power distribution.

These data, along with the detailed radial power distributions to be used in the generation of the thermal hydraulic model, are the primary physics input to the thermal hydraulic analyses performed in block 28 and 30 of FIG. 1. The primary result of the thermal hydraulic analyses is a set of curves giving power to fuel design limit on DNBR vs. axial shape index ($P_{fdn}$ vs. ASI). These $P_{fdn}$ curves are generated using the same basic power distributions as the $P_{fdl}$ curves, thus providing a consistent engineering design basis for both the LHR and the DNB analyses.

In order to assure that the SAFDL on DNBR is not exceeded during normal steady state operation and during anticipated operational occurrences, the following thermal-hydraulic limits are established.

1. The minimum DNBR (MDNBR), calculated using the CE-1 correlation, the W-3 correlation or similar correlation, must be greater than or equal to the DNBR SAFDL.
2. At the location of MDNBR, the quality must be less than the upper ranges of experimental quality for the respective correlations.

As represented in FIG. 2, for DNBR the power v1 to the thermal-hydraulic limit is calculated as a function of the following reactor variables: reactor inlet coolant temperature v4, primary system pressure v5, hot rod radial peaking factor v2, and axial shape v3. The design minimum primary system flow v6 is typically used for all steady state analyses and is therefore not considered a variable. FIG. 6 schematically shows a typical Pfdn curve which represents the percent power to reach the more limiting of the DNBR SAFDL or the quality limit, versus the peripheral or core average axial shape index. The curve represents the limit expressed in terms of power vs the axial power index, for all given burnups at a particular CEA insertion, as computed off line by a thermal hydraulic computer code at a set of reference coolant conditions (fixed inlet temperature, RCS pressure, and flow).

Reactor Coolant Saturation Limits

Another thermal hydraulic limit which must be maintained by the trip system is that the average coolant temperature at the exit of the core must be less than the saturation temperature. This limit is imposed primarily to assure meaningful thermal power measurements, since thermal power is inferred from temperature measurements.

Figure 7:
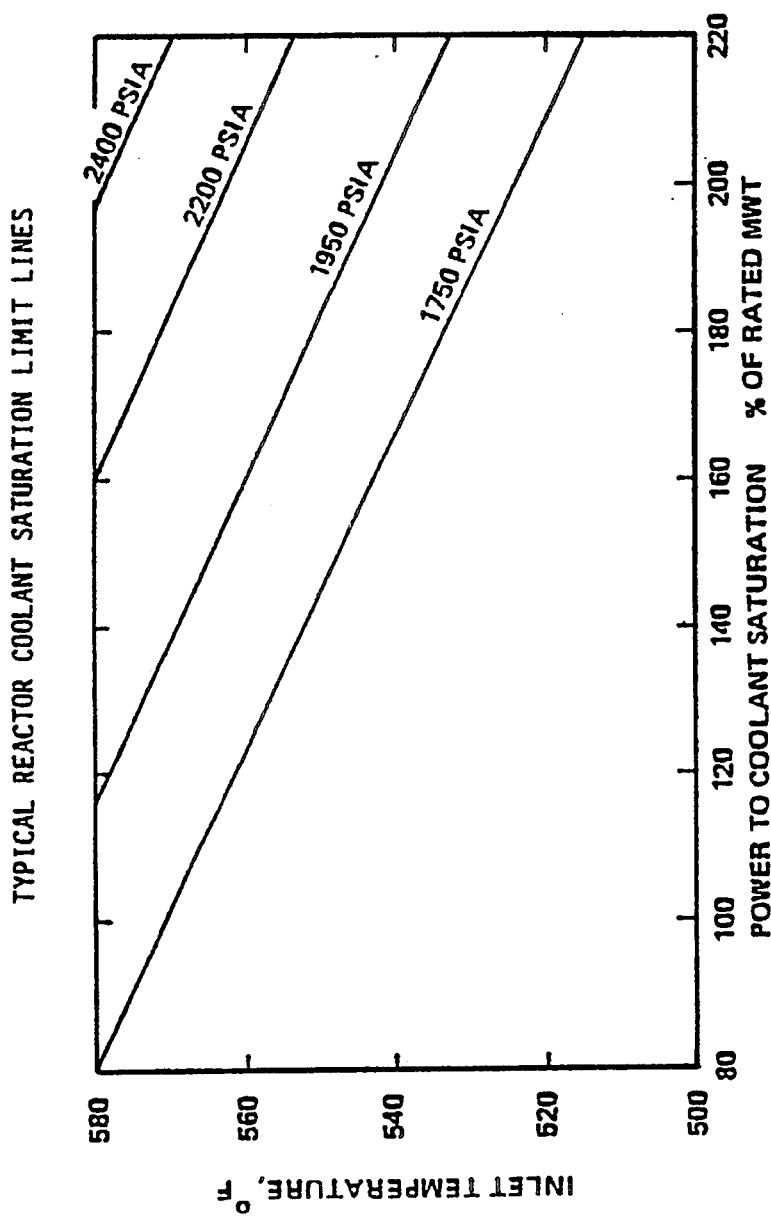
FIG. 7 is a graph showing a typical relationship among reactor inlet temperature, pressure, and coolant saturation.

The coolant saturation limit lines are the loci of the primary system pressure, reactor inlet coolant temperature, and core power where the average core outlet coolant temperature reaches saturation. These limits can easily be calculated on line through the use of polynominal equations as currently performed by CE's digital CPCs. Alternatively, these lines can be generated off-line as in the current analog setpoint analysis procedure, and the resultant data (FIG. 7) can be stored in the file represented by block 38 of FIG. 1 for use by the processor in an interpolation scheme.

Improvement Relative to the Analog RPS

The preceeding three sections are based on the conventional, analog RPS as described, for example, in the CENPD-199 document mentioned in the background portion of the specification. Additional details of the methodology may be found therein by the interested reader.

Figure 8:
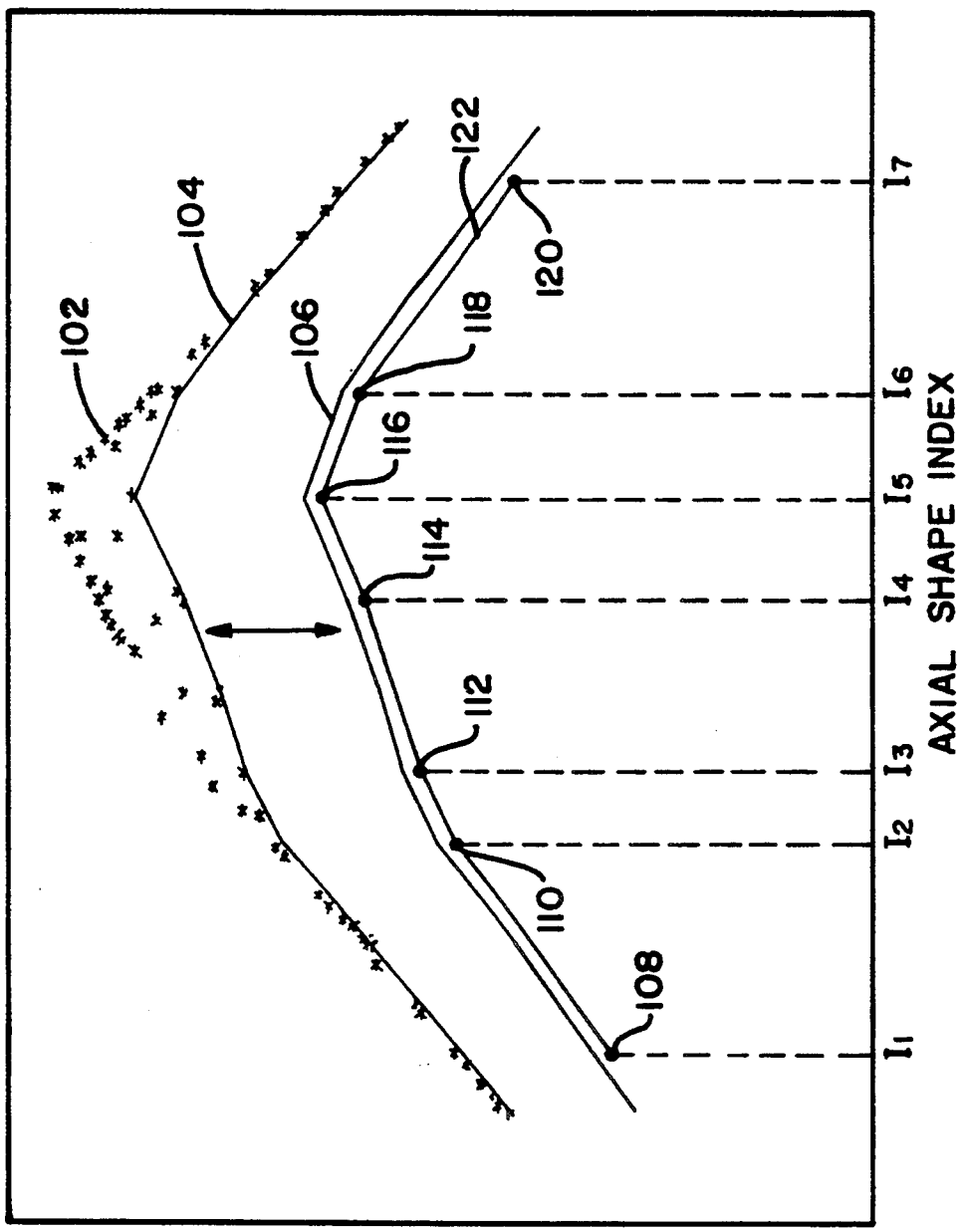
FIG. 8 is a graphic representation of how the data points shown in FIG. 6 are converted into data values for use with measured plant parameters on-line, in accordance with the present invention.

FIG. 8 schematically shows the so-called Pfdl fly specs 102 resulting from the off-line static computations using the LHR variables v of FIG. 2. These computations define a multi-dimensional operating space having a multi-dimensional gross limit surface, which can be viewed in different, two dimensional "slices". In the "slice" shown in FIG. 8, the allowed core power is shown as a gross surface boundary or limit line 104, with a dependence on excore axial shape index (for a particular CEA insertion). This gross limit line 104 defines a portion of the multi-dimensional limit surface within which the reactor is permitted to operate and outside of which the reactor must be tripped in response to a trip signal.

In a manner that is known in the relevant field of technology, and as described for example in the CENPD-199 document, the gross limit line is displaced in the conservative direction to account for the Dynamic Effects including various uncertainties associated with instrumentation and equipment lag considerations. This will be referred to herein as the net limit line 106.

It should be appreciated that each flyspec was run at a combination of variables v, at least some of which have corresponding parameters p. As mentioned above, the parameters P may be more coarse than their corresponding variables(v). For example, a particular flyspec 102 at a particular axial shape index p2 which corresponds to a first axial power distribution v2, has a counterpart situated elsewhere on the plot even when all parameters, including axial shape index are the same, except that the particular axial power distribution variable is different. This is because a variety of axial power distributions may result in the same axial shape index. For this reason, the gross limit line 104 is drawn so as to be under the lowest flyspec which, on the basis of the parameters p corresponding to the variables v of FIG. 2, is at the Pfdl.

The range of axial shape index is broken down into a convenient number of intervals, for example, I1–I7 as shown in FIG. 8. This establishes seven reference points 108–120 corresponding to the ordered pair of allowed core power *p1(r) and axial shape index p2(r), immediately below or equal to the net limit line 106. Alternatively, as shown in FIG. 9, a functional or piece wise linear fit 122 can be made to the points 108–120 under the condition that the functional value of fit 122 is always below or equal to the net limit line 106.

Figure 9:
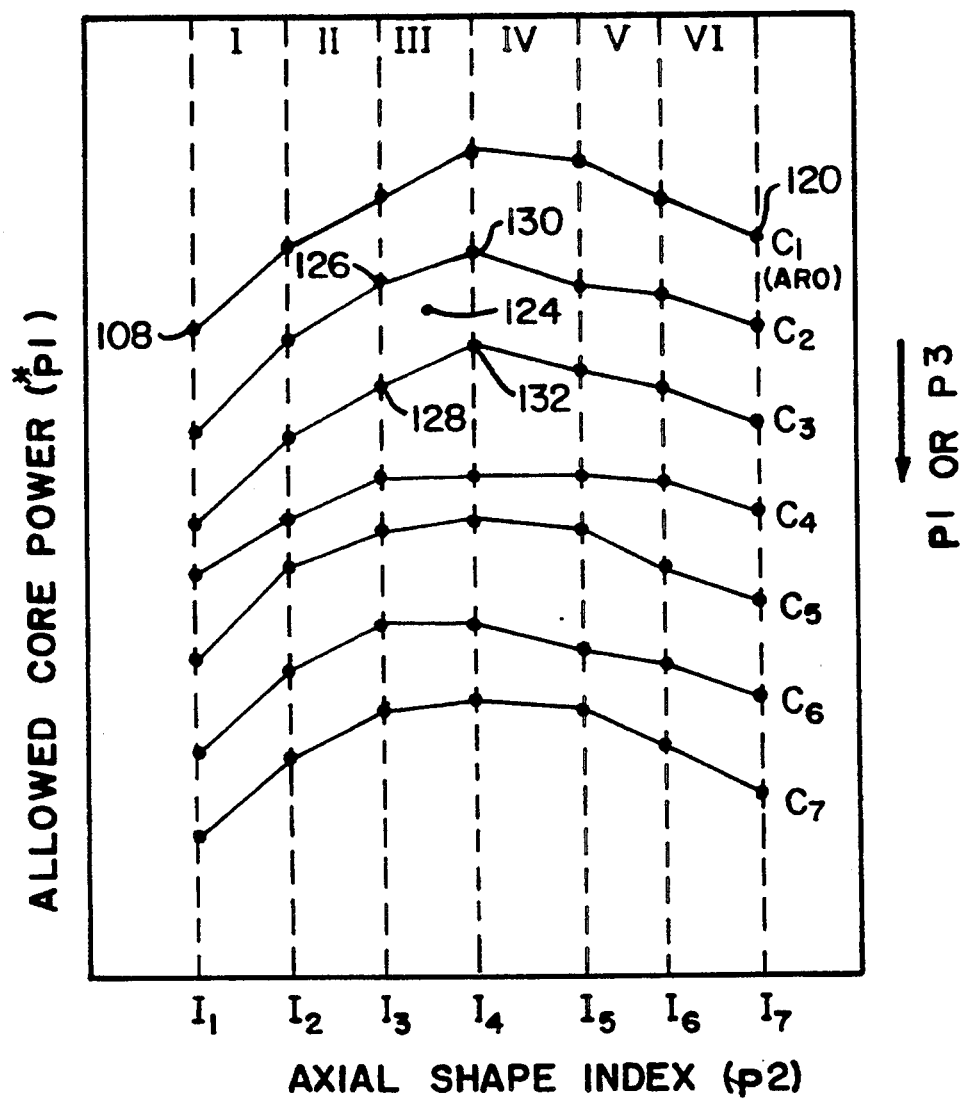
FIG. 9 is a graph in which the converted data points of FIG. 8 are shown for a plurality of control rod insertion configurations.

As shown in FIG. 9, the same sequence of computing a multiplicity of flyspecs, determining a gross limit line, a net limit line, and a functional or similar fit to the limit line, is performed off-line at a number of PDIL conditions C1 . . . C7 (which roughly model variations in the radial power distribution variable v3). The data points shown in FIG. 9 are then stored in data file 32 of FIG. 1 as an array having three dimensions corresponding to the ordered triplets [*p1(r), p2(r), p3(r)] of the dependence of the reference limit values of p1(r), on reference parameters p2(r) and p3(r). These were previously computed off-line in block 28 as functions of the v variables wherein at least parameters p1, p2 and p3 are commensurate with variables v1, v2 and v3. In practice, the array 32 would typically have between 100 to 400 triplets.

Through the Pfdls, a direct relationship is established among the modelled trip limit on $F_q^{3-D}$ (*v1), a gross core power parameter *p1, and the peaks of the axial and radial power distributions (p2, p3). The measure of axial power distribution (v2) in the plant is the ASI (p2). The radial power distribution (v3) is related to the CEA insertion at the plant. CEA insertion (p3) is inferred from measured power (p1') via the PDIL as shown in FIG. 3. Thus, the relationship among triplet variables *v1, v2, v3 is converted into a relationship among measurable parameters *p1, p2, p3 through this process.

In the plant RPS, processor 36 computes the base PFDL overpower, *p1, by a double linear interpolation as indicated with point 124 in FIG. 9.

The first step in the interpolation process will be to identify the ASI range in which the measured ASI CP2' falls (denoted by subscripts n and n−1). The second step will be to identify the CEA insertion range in which the allowed CEA insertion (C) falls (denoted by subscripts m and m−1). A double interpolation is then performed using the following equations:

$$*p1 = Y2 + \frac{(Y2 - Y1)}{(C_m - C_{m-1})} (C - C_m)$$

where:

$$Y2 = P1_{m,n} + \frac{(P1_{m,n} - P1_{m,n-1})}{(I_n - I_{n-1})} (p2' - I_n)$$

$$Y1_1 = P1_{m-1,n} + \frac{(P1_{m-1,n} - P1_{m-1,n-1})}{(I_n - I_{n-1})} (p2' - I_n)$$

More generally, the data in FIG. 9 can be expressed by the triplet [*p1(r), p2(r), p3(r)], where *p1(r) is the allowed core power at reference conditions p2(r) and p3(r), i.e., at ASI reference conditions $I_1$-$I_7$ and PDIL conditions $C_1$-$C_7$. To obtain the allowed core power *p1' at measured conditions p2', p3', an interpolation is made among the four reference triplets [*p1(r), p2(r), p3(r)] that are closest to p2', p3'. In FIG. 9, point 124 represents *p1', whereas points 126, 128, 130, and 132 represent the four reference triplets. The value of *p1' will be referred to as the base value of the trip parameter.

In those plants where the radial peaking factor $F_{xy}$ can be measured, for example, from incore detectors or the like, a further adjustment of the base value *p1 of the trip parameter can be made by means of a dial or the like in block 40 that has been calibrated for this purpose. Additional margin can be obtained if the actual measured value of unrodded Fxy at 40 is more favorable than the Fxy limit value of the parameter p3 that was assumed in the computation of the stored values at 32. Under these circumstances, an enhanced trip parameter signal is computed as follows:

$$F1 = \frac{\text{Unrodded } F_{xy} \text{ limit}}{\text{Unrodded } F_{xy} \text{ measured}}$$

$$*p = (*p1')(F_1)$$

Figure 10:
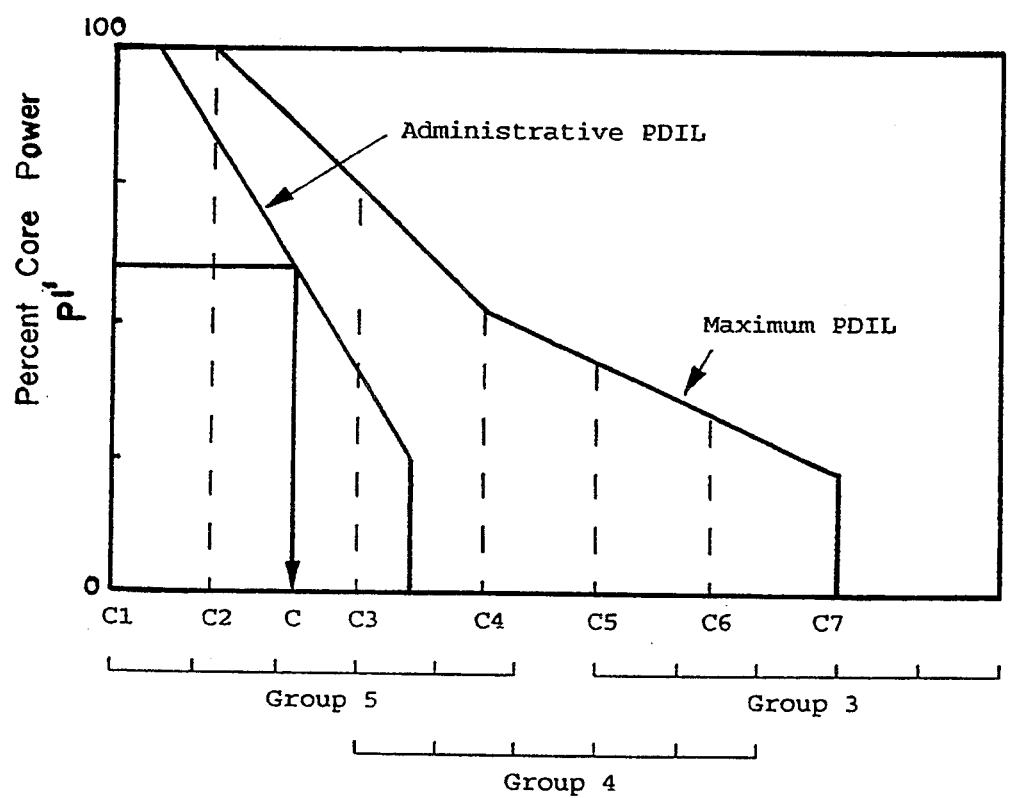
FIG. 10 is a graph similar to FIG. 3, showing an optional feature of the present invention, wherein greater operating margin can be achieved by the operator establishing an administrative PDIL that is more restrictive than the maximum PDIL.

Similarly, a PDIL operationally more restrictive than that of the plant Technical Specifications can be administratively imposed at the plant. By manually selecting the Administrative PDIL rather than the maximum (Tech Spec) PDIL, the operation substitutes a more favorable relation between *p1 and p3. The CEA insertion for a given power will then be inferred from the administrative PDIL at the plant rather than the maximum allowed Technical Specification, as shown in FIG. 10.

The storage array 32 for the thermal margin trip is, of necessity, more complex because of the greater number of variables and parameters involved. The first storage array can be similar to that of the LHR trip, i.e., a 20×20 array of triplets [*p1(r), p2(r), p3(r)] corresponding to power, axial shape index and control rod insertions. This produces a storage array having information similar to that of the points in FIG. 9. A double interpolation similar to that described above is then made and an interpollated point such as 124 is established.

Hence, in a process similar to that explained for the LHR trip, a correlation between the measurable parameters (p1, p2, p3) corresponding to the variables v1, v2, v3 is established through off-line analyses. In this case, the design thermal hydraulic code establishes the relationship between these parameters, rather than the simple expression which was the case of linear heat rate limit.

The triplet relationship [*p1(r), p2(r), p3(r)] is formed with the assumption that other related parameters p4, p5 ... pN are at constant values (called base coolant conditions). The base value of the overpower limit *p1' obtained at 124 in FIG. 11 must be adjusted for the differences between the measured values of inlet temperature (p4') and primary pressure (p5'), and the base values used in the calculation of FIG. 9. The relationship for variations in such other related parameters is obtained by having run the same design thermal hydraulic code off-line, and varying the parameters. Through this analysis an array of "Thermal Margin Sensitivity Data, TMSD" is generated (FIG. 11), which covers the range of RCS pressures and inlet temperatures possible during power operation. This is the data which is stored in the file represented by box 34 of FIG. 1.

TMSDS are the adjusting factors for changing the base limit *p1' from the base coolant conditions to a limit *p which corresponds to the measured values of the parameters p4, p5, or more. The adjusted limit *p will then be compared to the measured value of p1 to determine whether a trip signal should be generated. As an example, assume the parameter p6 to be constant at its minimum design (most limiting) value. The range of possible pressures can be divided into four pressures and four inlet temperature which cover the possible ranges. The range of the possible pressures could be limited by the high and low pressurizer pressure trips. The range of inlet temperatures could be governed by the low steam generator pressure trip and the opening setpoint of the steam generator safety valves. The thermal hydraulic code is run at each given pressure and inlet temperature combination for a selected set of axial power distributions representing the spectrum of the allowed ASI's. For each pressure-temperature combination, the minimum trip limit from this set of cases expressed in terms of power is selected. The difference or ratio of this overpower limit to the overpower limit at base coolant conditions will then become an adjustment data point as shown in FIG. 11.

Figure 11:
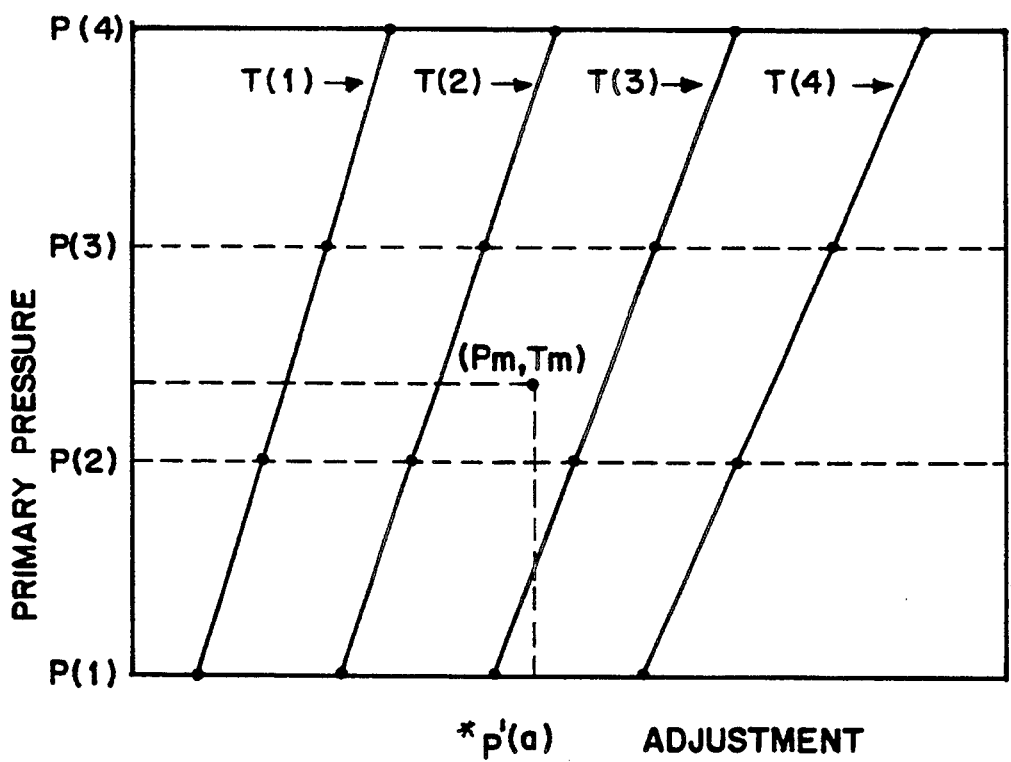
FIG. 11 is a graphic representation of how the measured parameters of primary pressure and temperature, can be used to adjust the base thermal margin limit as determined on line from the data points represented in FIG. 9.

The horizontal axis on FIG. 11 represents the scaling factor that is applied to the overpower margin obtained from FIG. 9 for different primary pressure and inlet temperature combinations. The vertical axis on FIG. 11 represents the measured primary pressure. P(1) on this figure represents the minimum pressure and P(4) represents the maximum pressure. The slanted lines represent the sensitivity (tradeoff) lines for constant inlet temperature values. The line labeled T(1) represents the maximum inlet temperature. The line labeled T(4) represents the minimum inlet temperature. Each large dot on FIG. 11 represents a triplet [*p1(a), p4(a), p5(a)].

The adjustment factor is determined through a linear interpolation similar to the one applied to FIG. 9 to calculate the overpower margin at base conditions. This is illustrated on FIG. 11 using broken lines. The coordinate (Pm,Tm) represents the measured primary pressure and inlet temperature. The interpolated value of the adjustment factor is labeled as point *p1'(a). The corresponding triplet is [*p1'(a), p4', p5']. The overpower at base conditions is multiplied by the calculated adjustment factor, e.g., *p=(*p1'(a))·(*p1').

The Thermal Margin Sensitivity Data may be expanded to include compensation for other parameters (e.g., coolant flow or ASI) and would require an additional interpolation with respect to the added parameter.

In essence, the DNB trip signal is generated by processing related triplets in two arrays. The first set of triplets are stored in data file 32, whereas the second set of triplets are stored in data file 34.

The present invention provides superior results in terms of expanded operating margin, relative to conventional analog RPS, in a manner which can best be illustrated with reference to FIGS. 8 and 9. The net limit line 106 of FIG. 8 represents the greatest operating margin one could implement in the plant, under the condition whereby (a) the axial power distribution is not known precisely; (b) thermal hydraulic calculations are not to be performed on line, and (3) the CEA's insertion is at the PDIL. In the conventional RPS, neither the net limit line 106, nor the particular points 108 . . . 120 at the ASI intervals I1 . . . I7, are explicitly stored in the plant. Rather, the analog circuitry, via adjustment of constance and the like, solves the expression set forth in the background portion of the present specification (or its equivalent), to produce a functional fit that is in general at or lower than the points 108-120 and associated limit line 122.

In the present invention, the points 108-120 for each of the control rod conditions C1-C7 shown in FIG. 9, are stored as reference conditions in the plant RPS. Thus, even for a particular pair p2, p3, represented by e.g., point 112, the allowed core power limit *p1 of the present invention, would be more favorable than that computed via the functional fit in the conventional RPS. In reality, for a given control rod insertion condition such as C3 as shown in FIG. 9, the conventional RPS would compute a trip limit which would correspond to an allowed core power below the limit line associated with C3 in FIG. 9. In the present invention, core power (p1) is used as an interpolating variable between the data points for curves C2 and C3, to compute on line, a higher margin to the base limit *p1. Additional interpolation on parameter p2 within the base or reference conditions of array 32 thus provides a first level of core margin improvement relative to the conventional RPS. The second level of improvement is provided by the further adjustments and interpolations arising from the use of operating parameters in conjunction with the TMSD, for example on measured parameters p4 and p5, whereby even more margin can be gained.

The resulting overpower can be further enhanced to measured radial power distribution values, if available, by the expression, $$*p = (F_2)(F_3)(*p1')(*p1'(a))$$

$$F_2 = \frac{FRM-CI}{FRL} \text{ for } FRM \geq FRL$$

$$F_2 = \frac{FRM-CD}{FRL} \text{ for } FR << FRL$$

where:
FRM=unrodded $F_r$ as measured by in-core instruments
FRL=unrodded $F_r$ Technical Specification limit
CI=scaling constant for increases in $F_r$
CD=scaling constant for decreases in $F_r$ This expression for $F_2$ reduces overpower margin when the measured $F_r$ value is greater than the Tech. Spec. limit, and increases overpower margin when the measured $F_r$ value is less than the Tech. Spec. limit.

The second factor ($F_3$) is based on the ratio of the unrodded $F_{xy}$ to $F_r$ values. In the $P_{fdn}$ analysis, the heat flux at the point of minimum DNBR is increased by this ratio to account for possible local power peaking (i.e., the "hot pin" is assumed to occur adjacent to the "hot channel"). The $F_3$ factor corrects the base overpower margin for differences between the measured ratio and the ratio applied in the $P_{fdn}$ analysis (i.e., the ratio of the Tech. Spec. limits). Factor $F_3$ may be calculated as follows:

$$F_3 = 1 + S\frac{R_M}{R_L} - 1$$

where:
$R_L$=FXYL/FRL
$R_M$=FXYM/FRM
FXYL=unrodded $F_{xy}$ Tech. Spec. limit
FXYM=unrodded $F_{xy}$ as measured by in-core instruments
FRL=unrodded $F_r$ Tech. Spec. limit
FRM=unrodded $F_r$ as measured by in-core instruments
S=scaling constant based on the sensitivity of DNB overpower to changes in heat flux at the point of minimum DNBR.

Different scaling constants (S) may be used for increases and decreases in $R_m$ relative to $R_L$.

This enhancement provides a margin gain when the measured $F_{xy}$ to $F_r$ ratio is lower than the ratio assumed in the Pfdn calculation.

Similarly, further enhancements can be made to take advantage of the flow which exceeds that specified in the plant Technical specification through the use of the on-line measured parameter p6. Parameter p6 is currently measured in analog type systems based on the pressure differential in across the SG tubes and used in the low flow trip. In cases where this measurement is easily accessible as an input, parameter p6 will be treated similar to parameters p4 and p5, with the reference condition being the Technical Specific limit for this parameter. If the on-line measurement is not easily accessible, the value of this parameter will be assumed constant at its Technical Specific value.

Although a particular example has been shown and described in the context of the analog system marketed by Combustion Engineering, Inc., the principles of the invention are adapted for implementation in other systems which presently utilize a coarse, straight line or functional representation of the operating space limit surface. These, too, can benefit from the substitution of a stored array of reference condition points which may be interpolated, and, in the case of the DNBR, further adjusted by a sensitivity array.

Figure 12:
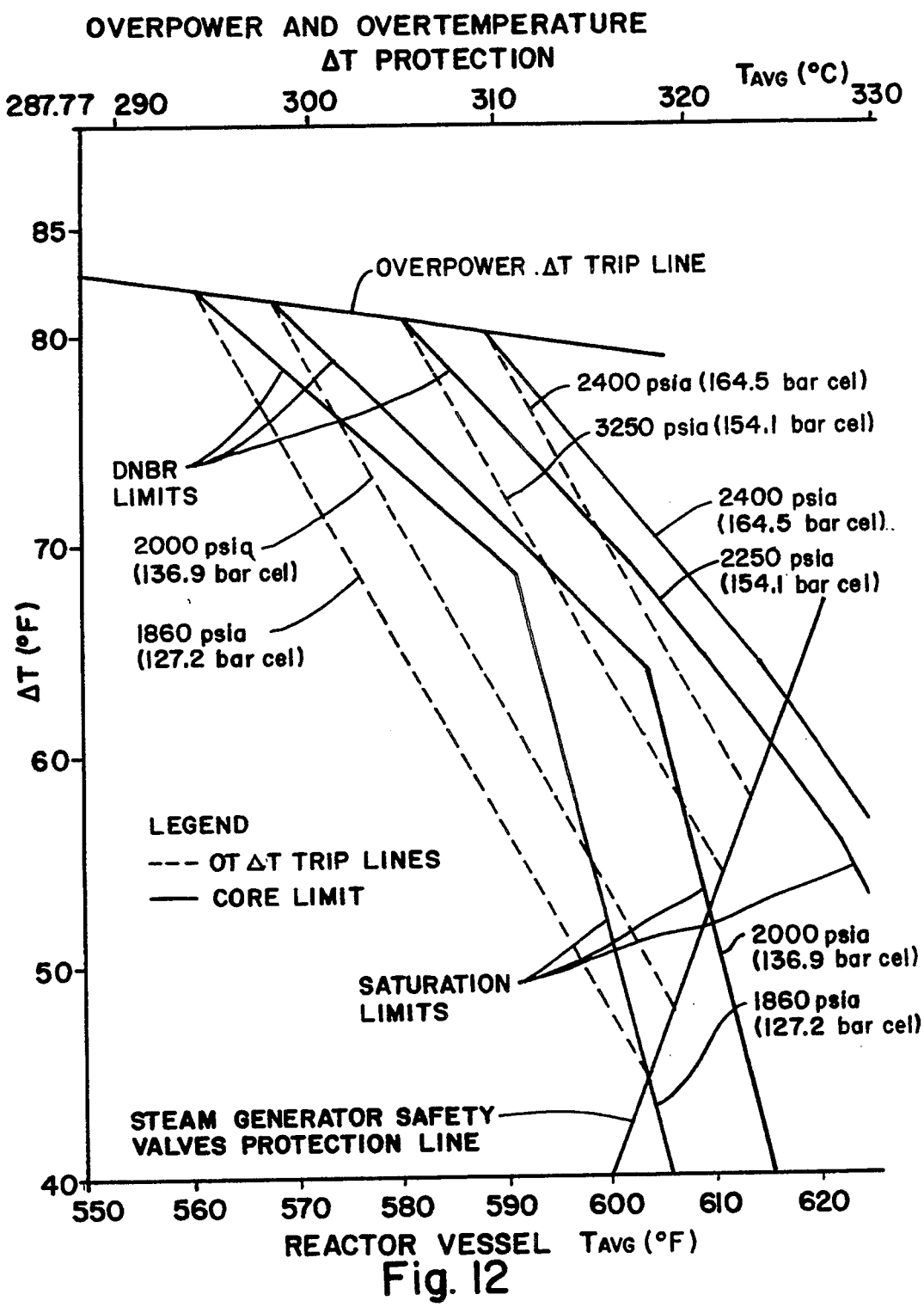
FIG. 12 is a graphic representation of the over power and over temperature fuel design limit relationships as currently implemented in some plants.
Figure 13:
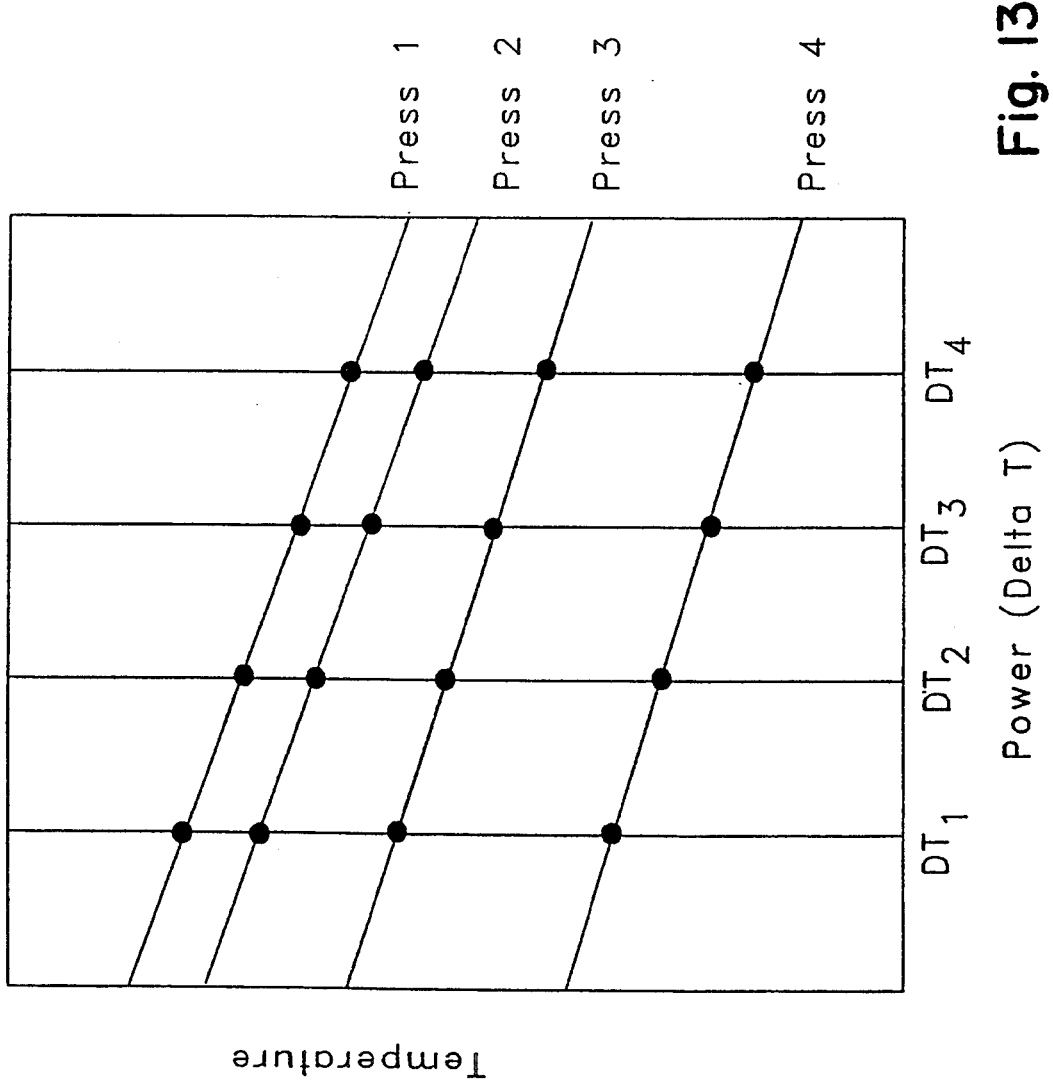
FIG. 13 is a graphic representation of how the present invention can be utilized to provide greater margin than is conventionally provided with respect to FIG. 12.

An alternative to the triplet relationship as described above can be more compatible with the methodology used in the generation of the setpoints per WCAP 8746 and FIG. 12. In this alternative triplet relationship, a limit *p1 is calculated for power (p1), as a function of core inlet or average temperature (p2) and RCS pressure (p3). The power (p1) may be inferred from the temperature differential of the hot and cold legs. This relationship is presented in FIG. 13. The points in this Figure are limits expressed in overtemperature for a given RCS pressure and power level which are obtained by running the design thermal hydraulic code off-line with assumptions described in Section 4-2 of WCAP 8746. WCAP 8746 includes derivation of the DNB limit lines, coolant quality limit lines, and core saturation limit lines. In the methodology, a fixed axial power distribution is used for generation of the DNB limit lines, and the allowance for other axial power distributions is applied explicitly at a later step. The FIG. 12 DNB limit lines are based on a design chopped cosine axial power distribution. The hot pin peak is an assumed linear function of power which is verified (off-line) to be conservative for the allowed rod insertion limits. Once the relationship of FIG. 13 is stored in block 28 file, the limit can be calculated on-line using the same interpolation method described previously. This limit is then adjusted for variations in axial power distribution through an Axial Flux Difference (similar to ASI) related penalty in the same manner as currently done in these units. Separate treatment of "the Power to DNB SAFDL limits" and the "Core Saturation Limit lines" per this method significantly increases the margin to reactor trip.

An example of the reduction in conservatism relative to conventional RPS for the Westinghouse plants, is illustrated in FIG. 12. The solid lines in this figure represent the core thermal margin limit lines (which consist of limit lines for DNB and saturation at the core exit). The dashed lines present the bounding curve fit upon which the Overtemperature Delta T trip setpoints have been conventionally derived, with a curve fit on the composite limit lines using a linear equation. In this particular instance, the impact of the present invention as described above in connection with FIG. 13, is to allow the solid lines of FIG. 12 to become the effective trip setpoints rather than the dashed lines. Transient dynamic effects are then separately accounted and allowed for, as described above.

It should also be appreciated that by merely interposing an analog to digital converter at the front end and a digital to analog converter at the back end, the RPS calculator 32, 34, 36 of the present invention can physically replace a conventional RPS calculator, port-for-port. In other words, whereas the conventional LHR trip calculator had an input port for the excore ASI parameter p2 and the core power parameter p1, and an output port for the generated trip signal, the present invention can use the same input and output ports, as conditioned through the A/D and D/A converters, respectively. Similarly, for the thermal margin trip, the conventional input ports for ASI (p2), core power (p1), inlet temperature (p4), and pressure (p5), can be received through the AD converter, processed through the storage arrays rather than in closed functional form, and a trip signal delivered via an output D/A converter.

APPENDIX

Selected Nomenclature

= variables used in off-line computations.

= parameters that are measured or derived from plant operations.

pN = arbitrary parameters (although p1 is, for convenience, the trip parameter). In the RPS of the present invention, N must have at least the values 1, 2 and 3.

pN($r$) = value of parameter pN at a reference condition of array 32.

pN($a$) = value of parameter pN at a base condition of adjustment array 34.

pN' = measured value of parameter N

*p1($r$) = value of the trip parameter p1 at the reference condition (e.g., [*p1($r$), p2($r$), p3($r$)].

*p1' = base value of the trip parameter resulting from interpolating among the values of *p1($r$) based on the comparison of the measured values of at least two reference parameters, with the reference values of said reference parameters, e.g., [*p1', p2', p3'].

*p1($a$) = value of base adjustment to trip parameter *p1', to reflect basic values of parameters other than reference parameters, e.g., [*p1($a$), p4($a$), p5($a$)].

*p1'($a$) = value of adjustment to trip parameter *p' resulting from interpolation among values of *p1($a$) based on comparison of measured values of parameters, e.g., [*p1'($a$), p4', p5'].

Fi = operator actuated enhancement factor to, e.g., *p1'.

*p = trip parameter limit signal; the value of the limit signal for p1 as the trip parameter can be one of e.g., (*p1'), (*p1'+*p1'($a$)), [(*p1'($a$))·(*p1')], ( F.*p1'),etc.

*pN = limit value of trip parameter pN on the limit surface of reactor operating space; if p1 is the trip parameter, *p1 is the limit value on the operating space.

We claim:

1. A method for generating a nuclear reactor on-line trip signal when a measured one (p1') of a plurality of at least three nuclear plant operating parameters (p1, p2, p3, . . . pN) which define a limit surface on a multidimensional reactor operating space, exceeds a limit value (*p1) on the limit surface, comprising:

(a) storing in an array having at least three dimensions, a set of discrete limit surface values *p1($r$) of parameter p1 in ordered triplets, under reference conditions in which parameters p2 and p3 vary discretely and parameters p4 . . . pN are deemed constant;

(b) while operating the reactor, measuring the on-line values p1', p2', p3' of the parameters p1, p2 and p3;

(c) selecting from the array, at least four of the triplets which have the closest relation of the triplet values p2($r$) and p3($r$) to the measured values p2' and p3';

(d) interpolating among the selected triplets to obtain an estimate *p1' of the surface limit value corresponding to the measured values of p2' and p3';

(e) delivering a trip parameter limit signal *p1 having the estimated value *p1' to a trip signal generator; and (f) comparing the measured value p1' with the value *p1' of the trip parameter limit signal *p1 in the trip signal generator and generating a trip signal if the measured value p1' exceeds the limit signal *p1.

2. The method of claim 1, wherein the trip parameter limit signal *p1 is a thermal margin trip signal, and the operating parameter p1, p2, and p3 are indicative of core gross power, axial power shape, and core radial power peak, respectively.

3. The method of claim 2 wherein, the operating parameters include reactor inlet temperature p4 and reactor pressure p5;

the step of measuring includes measuring p4' and p5';

the step of storing includes storing values in a second array defining a quantitative relationship among triplets;

the step of obtaining the estimated value *p1' of the trip limit of step (d) is followed by the step (d') of interpolating among values of p4(a) and p5(a) using the measured values p4', p5' to compute an adjustment, *p1'(a) which is added or factored to the value of *p1' to arrive at an adjusted estimate of the value of the power trip parameter limit signal, $$*p1 = *p1' + *p1'(a)$$

or $$*p1 = *p1' \cdot (*p1'(a)).$$

4. The method of claim 1, wherein, the trip parameter limit signal *p1 is a linear heat rate trip signal, and the operating parameters p1, p2, and p3 are indicative of core gross power, axial power shape, and core radial power peak, respectively.

5. The method of claim 1, wherein, the step of measuring includes measuring the on line values p4' and p5' of parameters p4 and p5;

the step of storing includes storing values in a second array defining a quantitative relationship among triplets;

the step of obtaining the estimated value *p1' of the trip limit of step (d) is followed by the step (d') of interpolating among values of p4(a) and p5(a) using the measured values p4', p5' to compute an adjustment, *p1'(a) which is added or factored to the value of *p1' to arrive at an adjusted estimate of the value of the trip parameter limit signal, $$*p1 = *p1' + *p1'(a)$$

or $$*p1 = *p1' \cdot (*p1'(a)).$$

6. The method of claim 5, wherein, the operating parameters p1, p2, and p3 are indicative of core gross power, axial power shape, and core radial power peak, respectively; and the operating parameters p4 and p5 are indicative of reactor inlet temperature and reactor pressure, respectively.

7. The method of claim 1, wherein, the operating parameters p1, p2, and p3 are indicative of core gross power, axial power shape, and core radial power peak, respectively.

8. The method of claim 7, wherein the trip limit signal *p1 is expressed in terms of overpower relative to rated power, the axial power shape is expressed in terms of an axial shape index, and the radial peaking is expressed in terms of power dependent control rod insertion limits.

9. The method of claim 8, wherein, the step of measuring includes measuring the on line values p4' and p5' of the parameters p4 and p5;

the step of storing includes storing values in a second array defining a quantitative relationship among triplets;

the step of obtaining the estimated value *p1' of the trip limit of step (d) is followed by the step (d') of interpolating among values of p4(a) and p5(a) using the measured values p4', p5' to compute an adjustment, *p1'(a) which is added or factored to the value of *p1' to arrive at an adjusted estimate of the value of the trip parameter limit, $$*p1 = *p1' + *p1'(a)$$

or $$*p1 = *p1' \cdot (*p1'(a)).$$

10. The method of claim 1, wherein the operating parameters p1, p2, and p3 are indicative of core gross power, core average coolant temperature, and reactor pressure.

11. The method of claim 1, wherein the trip limit estimated value is *p1' enhanced by at least one factor $F_i$, where one of said factors depends on the ratio of an on-line determination of radial power peak to the radial power peak corresponding to the plant technical specifications.

12. The method of claim 11, wherein said one factor depends on the on-line measurement of the radial peak.

13. The method of claim 11, wherein said one factor depends on administratively restricting the power dependent control rod insertion limits on line, to be more restrictive than the maximum power dependent control rod insertion limits permitted by the technical specifications.

14. An apparatus including means for generating a nuclear reactor on-line trip signal when a measured one (p1') of a plurality of at least three nuclear plant operating parameters (p1, p2, p3, . . . pN) which define a limit surface on a multidimensional reactor operating space, exceeds a limit value (*p1) on the limit surface, comprising:

(a) means for storing in an array having at least three dimensions, a set of discrete limit surface values *p1(r) of parameter p1 in ordered triplets, under reference conditions in which parameters p2 and p3 vary discretely and parameters p4 . . . pN are deemed constant;

(b) means for measuring the on-line values p1', p2', p3' of the parameters p1, p2 and p3;

(c) means for selecting from the array, at least four of the triplets which have the closest relation of the triplet values p2(r) and p3(r) to the measured values p2' and p3';

(d) means for interpolating among the selected triplets to obtain an estimate *p1' of the surface limit value *p1 corresponding to the measured values of p2' and p3';

(e) means for delivering the estimated value *p1' of *p1 to the trip signal generator; and (f) means for comparing the measured value p1' with the estimated limit value of *p1 and generating a trip signal if the measured value p1' exceeds the limit value of *p1.

15. The apparatus of claim 14, including means for measuring the operating parameters p4' and p5';

additional storage means including a second array defining a quantitative relationship among the triplets;

means for interpolating among values of p4(a) and p5(a) using the measured values p4', p5' to compute an adjustment, *p1'(a) which is added or factored to the value of *p1' to arrive at an adjusted estimate of the limit value, $$*p1 = *p1' + *p1'(a)$$

or $$*p1 = *p1' \cdot (*p1'(a)).$$

16. The apparatus of claim 14, including means for enhancing the estimated value *p1' by at least one factor $F_i$, to compute the trip limit signal *p1 where said one factor depends on a comparison of the on-line radial power peaking condition to a reference radial power peaking condition.

17. The apparatus of claim 14, including means for enhancing the estimated value *p1' by at least one factor $F_i$ to compute the trip limit signal *p1, where said one factor depends on a comparison of the on-line primary coolant mass flow rate condition to a reference primary coolant mass flow rate condition.

18. The apparatus of claim 16, including means for measuring the operating parameters p4' and p5';

additional storage means including a second array defining a quantitative relationship among the triplets;

means for interpolating among values of p4(a) and p5(a) using the measured values p4', p5' to compute an adjustment, *p1'(a) which is added or factored to the value of *p1' to arrive at an adjusted estimate of the limit value, $$*p1 = *p1' + *p1'(a)$$

or $$*p1 = *p1' \cdot (*p1'(a)).$$

19. The apparatus of claim 17, including means for measuring the operating parameters p4' and p5';

additional storage means including a second array defining a quantitative relationship among the triplets;

means for interpolating among values of p4(a) and p5(a) using the measured values p4', p5' to compute an adjustment, *p1'(a) which is added or factored to the value of *p1' to arrive at an adjusted estimate of the limit value, $$*p1 = *p1' + *p1'(a)$$

or $$*p1 = *p1' \cdot (*p1'(a)).$$

* * * * *

UNITED STATES PATENT AND TRADEMARK OFFICE
CERTIFICATE OF CORRECTION

PATENT NO. : 5,379,328
DATED : January 3, 1995
INVENTOR(S) : Rolando Perez et al It is certified that error appears in the above-indentified patent and that said Letters Patent is hereby corrected as shown below:

Column 20, line 38, after "value" delete "is"; before "enhanced" insert --is--.

Signed and Sealed this

Thirteenth Day of May, 1997

*Attest:*

*Attesting Officer*

BRUCE LEHMAN

*Commissioner of Patents and Trademarks*